Figure 6:
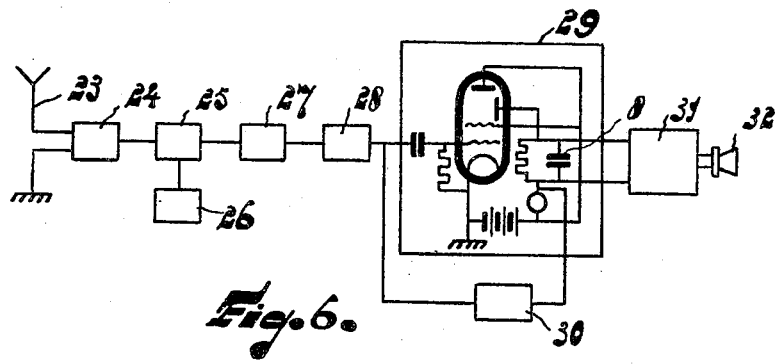

March 14, 1950  K. POSTHUMUS  2,500,863
CIRCUIT FOR CONVERTING A VOLTAGE OF GIVEN
SHAPE INTO A VOLTAGE OF DIFFERENT SHAPE
Filed Nov. 22, 1946  3 Sheets-Sheet 1
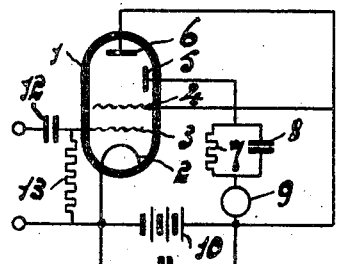
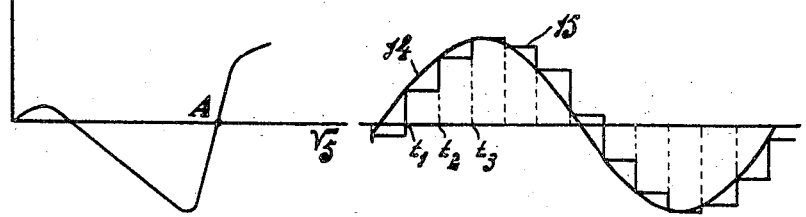
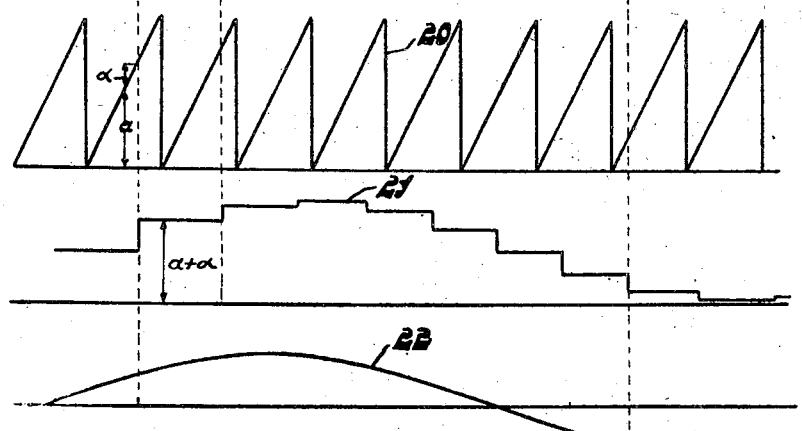
KLAAS POSTHUMUS
INVENTOR
AGENT March 14, 1950

K. POSTHUMUS 2,500,863

CIRCUIT FOR CONVERTING A VOLTAGE OF GIVEN
SHAPE INTO A VOLTAGE OF DIFFERENT SHAPE

Filed Nov. 22, 1946

3 Sheets-Sheet 2

KLAAS POSTHUMUS
INVENTOR

AGENT

Patented Mar. 14, 1950

2,500,863

UNITED STATES PATENT OFFICE 2,500,863

CIRCUIT FOR CONVERTING A VOLTAGE OF GIVEN SHAPE INTO A VOLTAGE OF DIFFERENT SHAPE

Klaas Posthumus, Eindhoven, Netherlands, assignor to Hartford National Bank and Trust Company, Hartford, Conn., as trustee Application November 22, 1946, Serial No. 711,689
In the Netherlands October 1, 1945

Section 1, Public Law 690, August 8, 1946
Patent expires October 1, 1965

13 Claims. (Cl. 250—27.1)

This invention relates to a circuit for converting a voltage of given shape into a voltage of different shape and, as the case may be, different frequency.

According to the invention the voltage to be converted is active in the charging circuit of a condenser, which circuit allows the passage of currents through a condenser in opposite directions, since the circuit comprises a non-linear element whose characteristic showing the current as a function of voltage passes through zero, this element being controlled by a pulsatory voltage consisting of short impulses with respect to their mutual distance in such manner that the charging circuit is operative only during the pulse.

The time-constant of the charging circuit is preferably given such a value that during each pulse the condenser is charged or discharged to the instantaneous value of the amplitude of the voltage to be converted occurring during this pulse, whilst the condenser is shunted by a resistance and the time-constant of the parallel connection is such that the condenser voltage remains substantially unvaried during the time comprised between two pulses.

In one form of construction of a circuit according to the invention the non-linear element is constituted by the impedance between the cathode and the secondary-emission electrode of a secondary-emission tube, the secondary-emission electrode of which has the same direct-current voltage with respect to the cathode as the anode.

The source supplying the voltage to be converted is preferably included in a circuit which connects the secondary-emission electrode to the anode.

When using periodic pulses for the control of the non-linear element in the charging circuit with a frequency which is high with respect to the frequency components to be transmitted, of the voltage to be converted, it is possible to take from the condenser a voltage the shape of which varies discontinuously with the frequency of the pulses and approximates that of the voltage to be converted. The approximation of the shape of the voltage to be converted is better, as the frequency of the supplied pulses is higher. A circuit of this kind is particularly adapted for use in a device for the conversion of a signal of variable amplitude into pulses of constant frequency, the duration of which is dependent on the instantaneous value of the amplitude of the signal. In the copending patent application Serial No. 711,688, filed November 22, 1946, now U. S. Patent 2,471,168, it was already suggested to effect this conversion by converting the signal of variable amplitude at first into an oscillation of which the instantaneous amplitude at equidistant moments discontinuously changes to the instantaneous value of the amplitude of the signal at these moments, while the frequency with which the discontinuous variation of the oscillation takes place corresponds to the desired pulse frequency and, subsequently, by converting this oscillation of discontinuously varying shape into pulses of the desired time-character. For the conversion of the signal of variable amplitude into the aforesaid oscillation use may be made of a circuit according to the invention.

The circuit according to the invention affords several other possibilities of application.

If the frequency of the periodic pulses is equal to, or a subharmonic of, the frequency of the voltage to be converted, it is possible to derive from the condenser a direct-current voltage the value and polarity of which are dependent on the time difference between a pulse and the adjacent zero passage of the voltage to be converted. This voltage may be used, for example, for readjusting the frequency of the pulses or the voltage to be converted.

With other relations between the frequency of a voltage to be converted and the frequency of the pulses it is possible to obtain voltages of staircase-like shape, which can be used for several purposes.

In a still other application of the invention the voltage to be converted is constituted by a sawtooth voltage of constant frequency, the pulsatory voltage being constituted by pulses which are modulated in phase by a signal to be reproduced and whose fundamental frequency is equal to the frequency of the sawtooth voltage. A circuit of this kind is particularly adapted for use in a wireless receiver for the phase-modulation of pulses. The circuit according to the invention may be included in the receiving cascade in such manner that the pulses obtained after rectification are supplied to it, the output voltage being supplied to a reproducing device, if desired through a filter which does not pass the fundamental frequency.

In order that the invention may be more clearly understood and readily carried into effect, it will now be described more fully with reference to the accompanying drawing.

Figure 1 shows one practical example of a circuit according to the invention. It comprises a secondary-emission tube 1, containing a cathode 2, a control grid 3, a screen grid 4, a secondary-emission electrode 5 and an anode 6. The secondary-emission electrode 5 is connected to the cathode 2 via the series-connection of a condenser 8 shunted by a resistance 7, a source of supply 9, which supplies the voltage to be converted, and a source 10 of direct-current voltage. The latter is shunted with respect to the frequency components to be transmitted of the voltage to be converted by a short-circuiting condenser 11. The anode 6 is connected to the screen grid 4 and to the source of supply 10, so that the anode 6 has the same direct-current voltage with respect to the cathode as the secondary-emission electrode 5.

The control grid 3 has supplied to it a positive voltage impulse with respect to the cathode 2, the duration of which is small with respect to the mutual distance of the pulses. The voltage impulses are supplied via a condenser 12 and a resistance 13, the latter being connected between the grid 3 and the cathode 2. The value of the positive voltage is such that the tube 1 can only be conductive during the short pulse.

In the described circuit the condenser 8 is included in a circuit, termed charging circuit, which comprises the source 10 of direct-current voltage, the non-linear impedance included between the cathode 2 and the secondary-emission electrode 5, and the source of supply 9.

The characteristic showing the current $I_5$ as a function of the voltage $V_5$ of the non-linear element in the charging circuit at given anodes and screen-grid voltages is represented qualitatively in Figure 2. From this figure it appears that the characteristic passes through zero at a point A. This point is independent of the control-grid voltage and lies at a value of $V_5$, which is substantially equal to the given anode voltage.

If, as is shown in Figure 1, the voltage between the secondary-emission electrode 5 and the cathode 2 is made equal to the anode voltage by connecting the electrode 5 conductively to the anode 6, then tube 1 is adjusted at point A of the characteristic shown in Figure 2 and the charging circuit is not traversed by current. If the voltage of the secondary-emission electrode 5 with respect to the cathode exceeds the said value, a current may flow in the charging circuit from the secondary-emission electrode to the cathode with the result that condenser 8 is charged or discharged. If the voltage of the secondary-emission electrode 5 falls below the said value, condenser 8 may be charged or discharged by a current in the opposite direction.

In the presence of a source of supply 9 a current flows in the charging circuit and the condenser 8 is charged or discharged during the short time of the pulse in which a positive voltage is supplied to the grid 3 of tube 1. The value of the voltage to which the condenser 8 is charged is dependent on the time-constant of the charging circuit. If this time constant is small, then during each pulse condenser 8 will be charged to the instantaneous value, during this pulse, of the amplitude of the voltage supplied by the source 9.

The variation of the condenser voltage between two pulses is dependent on the time-constant of the parallel-connection of the resistance 7 and the condenser 8. If this time constant is great, in other words if the time of discharge of the condenser 8 is long with respect to the mutual distance of the pulses, the voltage set up at the condenser substantially retains the value to which it was charged during the preceding pulse so that the voltage set up at condenser 8 between two pulses is substantially horizontal in shape.

As long as the source 9 supplies to the secondary-emission electrode 5 a voltage which is positive with respect to the anode, and the instantaneous value of the amplitude of this voltage increases with time, the voltage supplied during each following pulse is greater than the voltage of the condenser 8 and the latter is charged by the current flowing in the charging circuit from the electrode 5 to the cathode 2. If, however, the instantaneous value of the supplied voltage falls below the voltage of the condenser due to the fact that the differential quotient of the supplied voltage inverses its polarity according to time, the potential of the elecrode 5 falls below that of the anode and the current flowing in the charging circuit changes its direction. The condenser is thus discharged until the instantaneous value is obtained.

During the other cycle of the voltage of the source of supply 9, in which a negative voltage with respect to the cathode is supplied to the electrode 5 by the voltage to be converted, the condenser 8 is charged during each pulse by the current flowing in the charging circuit from the cathode 2 to the electrode 5 and subsequently discharged by a current flowing in the opposite direction.

Consequently, the voltage across the condenser 8 will vary discontinuously as shown in Figure 3. In this figure the voltage supplied to the impedance 9 and the discontinuously varying voltage set up at the condenser 8 are designated 14 and 15 respectively. As shown in the figure, the value of the output voltage at equidistant moments $t_1, t_2, t_3 \ldots t_a$, in which the pulses occur, changes discontinuously into the instantaneous value of the amplitude of the voltage supplied by the source 9 at these moments. The frequency with which the discontinuous variation of the output voltage takes place is thus equal to that of the pulses supplied to the grid 3 of tube 1. If this frequency is sufficiently high with respect to the highest frequency component to be transmitted of the voltage to be converted, the discontinuously varying voltage of the condenser approximates the shape of the voltage to be converted. The approximation is better, as the frequency of the control impulses is higher.

If the frequency of the voltage impulses supplied to the grid 3 is equal to that of the voltage supplied by the source 9 there is set up at the condenser 8 a direct-current voltage the value and polarity of which are dependent on the phase difference between the voltage supplied by the source 9 and the pulsatory voltage.

In Figure 4 the voltage supplied by the source 9 is designated 16, whilst the voltage impulses are denoted by 17 and 17' respectively. With the phase difference which exists, as shown in the figure, between the voltage 16 and the pulses 17 which are represented in full lines, the condenser 8 is charged to a direct-current voltage which is represented by a horizontal line 18. If, however, the dotted impulses 17' are supplied to the grid 3, the condenser 8 is charged to a direct-current voltage of opposite polarity which is represented by the line 18'. The value and polarity of the direct-current voltage are therefore dependent on the phase-shift between the voltages 16, 17 and 16', 17' respectively.

If the frequency of the pulses is a subharmonic of the voltage supplied by the source 9, the phase-difference between the two voltages is disregarded and the voltage supplied by the source 9 is converted into a direct-current voltage the value and polarity of which are dependent on the time difference between the occurrence of a voltage impulse and the occurrence of the adjacent zero passage of the voltage to be converted.

As mentioned already in the preamble, this direct-current voltage may be used, for example, for readjusting the frequency of the pulses or the voltage to be converted.

With reference to the curves shown in Figure 5 we will explain more fully the use of the circuit according to the invention for the detection of pulses modulated in phase by a signal to be reproduced.

In Figure 5 the phase-modulated pulses are indicated by 19. The mean frequency of these pulses, termed fundamental frequency, is constant but the time difference between the moment at which the pulses occur and the moment at which they would occur in the unmodulated state, termed phase, varies according to the instantaneous value of the amplitude of the signal to be reproduced. These pulses are supplied to the grid 3 of tube 1. In this application the voltage to be converted is constituted by a sawtooth voltage 20, the frequency of which is equal to the fundamental frequency of the pulses. As described before, by correct proportioning of the time constant of the charging circuit and of the parallel-connected resistance 7 and condenser 8 we obtain a voltage whose amplitude corresponds at any moment to the instantaneous value, during the preceding pulse, of the amplitude of the voltage supplied by the source 9, in the present instance a sawtooth voltage 20. The variation of the voltage set up at the condenser 8 is represented by the curve 21 in Figure 5.

Assuming the pulses 19 in the unmodulated state to coincide with the centre of the inclined flank of the sawtooth curve 20, then the voltage set up at the condenser 8 is a direct-current voltage which is equal to the mean amplitude $a$ of the sawtooth voltage. When pulses modulated in phase are supplied to the grid 3 the difference $\alpha$ which occurs, during each impulse, between the amplitude of the sawtooth voltage and the mean amplitude $a$, is proportional to the phase of the pulses concerned. The instantaneous value of the amplitude of the sawtooth voltage $(a+\alpha)$ during each pulse consequently varies with the phase of the pulses supplied to the grid 3 and hence with the instantaneous value of the amplitude of the signal to be reproduced.

The signal to be reproduced is represented by the curve 22 in Figure 5. It may be derived from the voltage of the condenser by means of a low-pass filter which does not pass the fundamental frequency of the pulses.

Such a filter is only required, however, if the fundamental frequency of the pulses has such a value that it might lead to disturbances in the reproduction. If, however, the fundamental frequency lies outside the range of frequencies of the reproducing device or outside the audible range of frequencies, the voltage 21 set up at the condenser 8 may be supplied to the reproducing device without the interposition of a filter.

When using the described device in a wireless receiver for the phase-modulation of pulses, it is included in the receiving cascade in such manner that the phase-modulated pulses obtained after detection are supplied to it. One form of construction of such a wireless receiver is shown diagrammatically in Figure 6.

The carrier-wave received in an aerial 23 and modulated by pulses is supplied to a high-frequency amplifier 24 which is connected in cascade to a mixing stage 25 having a corresponding local oscillator 26, an intermediate-frequency amplifier 27 and a detector 28. The variation of the output voltage of the detector 28 is represented by the curve 19 in Figure 5. This voltage is supplied, on the one hand, to a device 29 according to the invention, which is wholly identical to the form of construction shown in Figure 1, and on the other hand these pulses which are modulated in phase have derived from them a voltage having a frequency equal to the fundamental frequency of the pulses and which in a device 30 is either converted into a sawtooth voltage 20 (Figure 5), or used for the synchronisation of a sawtooth voltage generated by the device 30. The voltage 20 is supplied to the device 29 according to the invention.

Consequently, the voltage set up at the condenser 8 of the device 29 will have a shape which is represented by 21 in Figure 5. By means of a filter 31 this voltage is converted into the signal 22 to be reproduced and supplied to a reproducing device, for example a loudspeaker 32.

The described form of construction is adapted for the reception of phase modulation of pulses with the aid of single pulses. It is also known to utilize phase modulation of pulses with the aid of double pulses, in which event pulses of the fundamental frequency of the signal pulses and of constant phase (timing pulses) are emitted together with the signal impulses 19. At the receiving end these timing pulses, after being separated from the signal impulses, may be used for the synchronisation of the sawtooth voltage generated by a device 30.

By means of the device according to the invention it is alternatively possible for pulses modulated in frequency by a signal and in general for pulses which are short with respect to their mutual distance, which distance is dependent on the instantaneous value of the amplitude of the signal, to be converted into amplitude variations corresponding to this signal.

Figure 7:
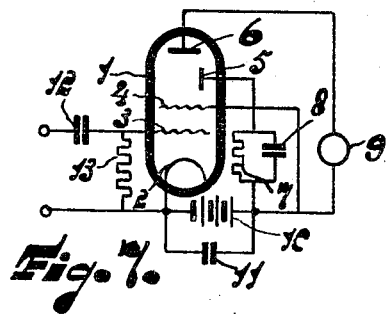

Fig. 7 shows one form of construction of a circuit according to the invention, in which the parts corresponding with those of the circuit shown in Fig. 1 are designated by the same reference numerals. The circuit shown in Fig. 7 differs from the circuit already described in that the source of supply 9 is included in a circuit connecting the anode 6 to the cathode 2 instead of in a circuit connecting the secondary-emission electrode 5 to the cathode 2. The operation of the circuit is, however, fundamentally identical. In the circuit shown in Fig. 7 the source of supply 9 is also included in a circuit connecting the secondary-emission electrode 5 to the anode, so that owing to the voltage supplied by the source 9 the potential of the secondary-emission electrode 5 rises or decreases with respect to that of the anode. The magnitude and the sense of the current in the charging circuit are thus affected, so that in this arrangement also the voltage of the source 9 is active in the charging circuit.

Figure 8:
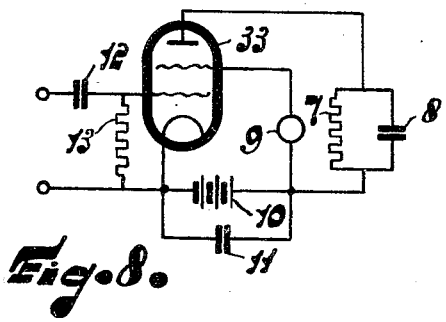

Fig. 8 shows one form of construction in which use is made of a screen-grid tube 33. As is well-known, the characteristic curve of a screen-grid tube showing the anode current as a function of the anode voltage may, at a given screen-grid voltage, exhibit a variation similar to that of the curve shown in Fig. 2; at the point at which the characteristic curve passes through zero the anode voltage is approximately equal to the given screen-grid voltage. Consequently, the non-linear impedance in the charging circuit of the condenser is in this case constituted by the anode-cathode impedance of the tube 33, whilst the source 9, which supplies the voltage to be converted, is included in the screen-grid circuit. The operation of the circuit is entirely identical to that of the circuit shown in Fig. 7, so that it will not be set out here in detail. If desired, the source supplying the voltage to be converted may be included, in series with the parallel connection of the resistance 7 and the condenser 6, in the anode circuit, as in the arrangement shown in Fig. 1.

Figure 9:
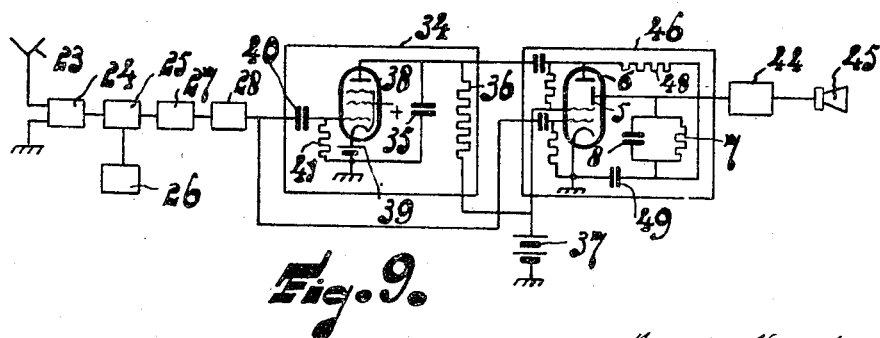

Fig. 9 illustrates a further application of the circuit according to the invention in a radio-receiver for the phase modulation of pulses. In this receiver the phase-modulated pulses occurring in the output circuit of the detector 28 are supplied to a device 34 which converts the phase-modulated pulses into a saw-tooth current or voltage, the time during which the current or voltage varies in a given sense being dependent on the interval between the pulses, whereas the time during which the sawtooth current or voltage varies in the opposite sense is constant and the variation of the current or voltage during this constant time is always the same.

In this form of construction the device 34 comprises a condenser 35 which is charged, through a resistance 36, by a source 37 of direct voltage and which can be discharged through a discharge tube 38 which is preferably realised as a screen-grid tube, more particularly as a pentode. The grid of the tube 38 has such a negative voltage supplied to it from a source 39 that the tube 38 is blocked under normal conditions. As an alternative, the negative voltage may be supplied by the correct proportioning of a grid condenser and a grid leak resistance.

Pulses to be converted the intervals of which vary with the instantaneous value of the amplitude of a signal to be reproduced are supplied, via a condenser 40 and a resistance 41, to a grid of the tube 38 in such manner that the tube 38 is conductive during each of the pulses supplied so that the time of discharge of the condenser 35 is determined by the duration of the impulse and the time of charge by the intervals between the pulses. If the intervals between the supplied pulses are constant, a sawtooth voltage having the fundamental frequency of the supplied pulses and a constant amplitude is set up at the condenser 35. If, however, the intervals between the pulses vary in accordance with the instantaneous value of the amplitude of a signal to be reproduced, there is set up at the condenser a sawtooth voltage the maximum amplitude of which varies with the instantaneous value of the signal.

Figure 10:
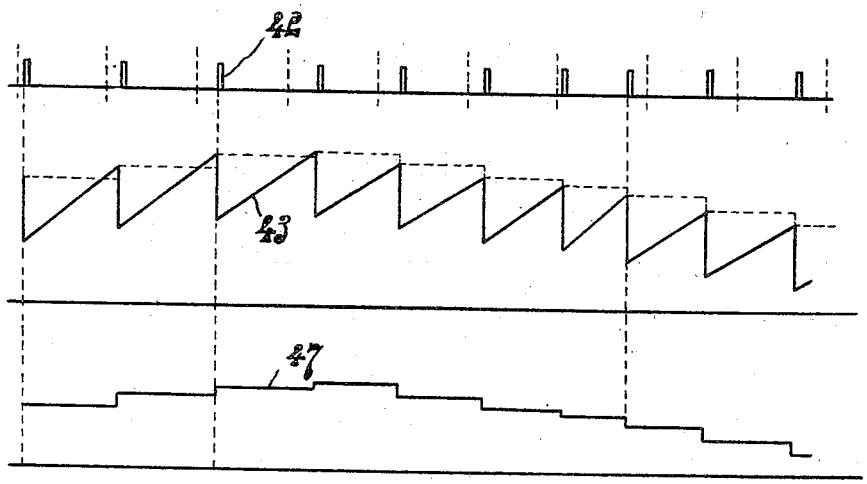

In Fig. 10 the pulses to be detected, which are supplied to the grid of the tube 38, are designated by 42. The character of these pulses consists in that the mean frequency of the pulses (fundamental frequency) is constant, whereas their phase is proportional to the instantaneous value of the amplitude of a signal to be reproduced.

The voltage set up at condenser 35 is designated by 43 in Fig. 10. The maximum amplitude of this voltage is proportional to the phase of the pulses supplied and hence to the instantaneous value of the amplitude of the signal to be reproduced. The signal to be reproduced may be derived from this voltage by supplying the voltage concerned to a reproducing device through a low-pass filter which blocks the fundamental frequency of the pulses and, as the case may be, through an amplifier 44.

However, in those cases in which the fundamental frequency approximates the highest modulation frequency it is difficult to construct a filter in such manner that the fundamental frequency is not passed, or passed to the least possible extent without at the same time materially attenuating the highest modulation frequencies.

For the suppression of the fundamental frequency without materially affecting the mutual relation between the modulation frequencies use may be made of a circuit according to the invention. A circuit according to the invention included in the receiving cascade is designated by 46. This circuit is fundamentally identical with that shown in Fig. 7. The sawtooth output voltage of the device 35 which is to be converted and which comprises the frequency components of the signal to be reproduced and the fundamental frequency of the pulses is supplied to the anode of the tube 6. The phase-modulated pulses occurring in the output circuit of the detector 28 are supplied to the grid of the tube 6. Consequently, at the condenser 8 of the device 46 there is set up a voltage, the amplitude of which at any moment is determined by the instantaneous value of the voltage supplied to the anode during the preceding pulse. The variation of this voltage is represented in Fig. 10 by curve 47. The variation of this curve shows that the fundamental frequency of the pulses is substantially suppressed. The ratio between the frequency components of the signal to be reproduced has, however, undergone little change.

In the form of construction of the circuit according to the invention shown in Fig. 9 the direct anode voltage for the tube 6 is supplied by the source 37. The direct voltage for the secondary emission electrode 5, which must be substantially equal to the direct anode voltage, is derived from the anode voltage of the tube 6 through a smoothing filter comprising a resistance 48 and a condenser 49. The object of the filter is to prevent the alternating voltages set up at the anode of the tube 6 from being supplied to the secondary emission electrode of the tube 6.

What I claim is:

1. An electronic system for combining an alternating wave with recurrent voltage pulses to produce an output voltage depending on the relationship of said wave and said pulses, said system comprising an electron discharge device provided with a cathode, a secondary emission electrode and an anode electrode, a source of direct potential connected between said cathode and both of said electrodes whereby substantially the same value of potential is impressed on said electrodes, a capacitative output impedance interposed between said secondary emission electrode and said source, means to apply the alternating wave to one of said electrodes, and means to apply the recurrent pulses to said device to render same operative only for the duration of said pulses, whereby said output voltage is developed across said output impedance.

2. An electronic system for combining an alternating wave with recurrent voltage pulses to produce an output voltage depending on the relationship of said wave and said pulses, said system comprising an electron discharge device provided with a cathode, a control grid, a secondary emission electrode and an anode electrode, a source of direct potential connected between said cathode and both of said electrodes whereby substantially the same value of potential is impressed on said electrodes, an output impedance interposed between said secondary emission electrode and said source, said impedance including a capacitance in parallel with a resistance, means to apply the alternating wave to one of said electrodes, and means to apply the recurrent pulses to said control grid to render said device operative only for the duration of said pulses whereby said output voltage is developed across said output impedance.

3. A system as set forth in claim 2, wherein said device is also provided with a screen grid, said screen grid being connected to said anode electrode, and further including a by-pass capacitor connected across said source.

4. An electronic system comprising an electron discharge device provided with a cathode, a control grid, a secondary emission electrode and an anode electrode, a direct potential source connected between said cathode and both of said electrodes, an output impedance interposed between said secondary emission electrode and said direct potential source, an alternating wave source interposed between one of said electrodes and said direct potential source, a source of recurrent voltage pulses, and means to apply said pulses to said grid to render said device operative only for the duration of each of said pulses.

5. An electronic system comprising an electron discharge device provided with a cathode, a control grid, a secondary emission electrode and an anode electrode, a direct potential source connected between said cathode and both of said electrodes, an output impedance interposed between said secondary emission electrode and said direct potential source, an alternating wave source interposed between one of said electrodes and said direct potential source, a source of recurrent voltage pulses, and means to apply said pulses to said grid to render said device operative only for the duration of each of said pulses, said impedance including a capacitance in shunt relation with a resistance, the charging circuit including said impedance and said devce in the operative condition having a time constant which is smaller than the duration of the recurrent pulses, said output impedance having a time constant which is greater than the interval between successive pulses.

6. An electron system comprising an electron discharge device provided with a cathode, a control grid, a secondary emission electrode and an anode electrode, a direct potential source connected between said cathode and both of said electrodes, an output impedance interposed between said secondary emission electrode and said direct potential source, an alternating wave source connected in series with said output impedance, said output impedance including a capacitance in shunt relation with a resistance, a source of recurrent voltage pulses, and means to apply said pulses to said grid to render said device operative for the duration of said pulses.

7. An electrode system comprising an electron discharge system provided with a cathode, a control grid, a secondary emission electrode and an anode electrode, a source of direct potential connected between said cathode and both of said electrodes whereby substantially the same value of potential is impressed on said electrodes, an output impedance interposed between said secondary emission electrode and said direct potential source, said impedance including a capacitance in parallel with a resistance, an alternating wave source interposed between said anode electrode and said direct potential source, a source of recurrent voltage pulses, and means to apply said pulses to said grid to render said device operative only for the duration of each of said pulses.

8. An electronic system comprising an electron discharge tube provided with a cathode, a control grid, a secondary emission electrode and an anode electrode, a direct potential source connected between said cathode and both of said electrodes, an output impedance interposed between said secondary emission electrode and said direct potential source, said impedance including a capacitance in parallel with a resistance, an alternating wave source interposed between one of said electrodes and said direct potential source, a source of periodic voltage pulses whose repetition rate is high relative to the frequency of said wave, and means to apply said periodic pulses to said control grid to render said device operative for the duration of said pulses whereby an alternating voltage is developed across said impedance whose frequency corresponds with the frequency of said wave and whose voltage curve varies in a step wise manner in accordance with the repetition rate of said pulses.

9. An electronic system comprising an electron discharge device provided with a cathode, a control grid, a secondary emission electrode and an anode electrode, a source of direct potential connected between said cathode and both of said electrodes whereby substantially the same value of potential is impressed on said electrodes, an output impedance interposed between said secondary emission electrode and said direct potential source, said impedance including a capacitance in parallel with a resistance, an alternating wave source connected in series with said impedance, a source of periodic voltage pulses whose repetition rate is equal to a subharmonic of the frequency of said wave, means to apply said pulses to said control grid to render said device operative only for the duration of said pulses, whereby a direct output voltage is developed across said impedance whose magnitude and polarity depends on the time interval between a pulse and the adjacent zero voltage point of said alternating wave.

10. An electronic system comprising an electron discharge device provided with a cathode, a control grid, a secondary emission electrode and an anode electrode, a source of direct potential connected between said cathode and both of said electrodes whereby substantially the same value of potential is impressed on said electrodes, an output impedance interposed between said secondary emission electrode and said direct potential source, said impedance including a capacitance in parallel with a resistance, a sawtooth wave source having a predetermined frequency connected in series with said impedance, a source of periodic voltage pulses whose repetition rate is equal to the frequency of said wave, said pulses being phase modulated in accordance with an intelligence signal, and means to apply said pulses to said grid to render said device operative for the duration of said pulses.

11. An arrangement as set forth in claim 10 wherein said sawtooth wave source is modulated by said phase modulated pulses so that the excursion period of the sawtooth wave depends on the distance between successive pulses, whereas the flyback period remains constant.

12. A radio receiver for the reception of a carrier modulated by periodic pulses whose phase varies in accordance with the instantaneous amplitude of an intelligence signal comprising a detector for deriving said pulses from said carrier, and apparatus for deriving the phase modulation component from said pulses including an electron discharge device provided with a cathode, a control grid, a secondary emission electrode and an anode electrode, a source of direct potential connected between said cathode and both of said electrodes whereby substantially the same value of potential is impressed on said electrodes, an output impedance interposed between said secondary emission electrode and said direct potential source, said impedance including a capacitance in parallel with a resistance, a sawtooth wave source connected in series with said impedance, and means to apply the detected pulses to said control grid to render said device operative only for the duration of said pulses, the frequency of said sawtooth wave being equal to the repetition rate of said detected pulses.

13. A radio receiver as set forth in claim 12 further including a reproducer, a filter arranged to discriminate against the frequency equal to the repetition rate of said pulses, and means to apply the voltage developed across said output impedance through said filter to said reproducer.

KLAAS POSTHUMUS.

REFERENCES CITED

The following references are of record in the file of this patent:

UNITED STATES PATENTS

| Number | Name | Date |
|---|---|---|
| 2,235,190 | Alma et al. | Mar. 18, 1941 |
| 2,250,708 | Herz | July 29, 1941 |
| 2,335,265 | Dodington | Nov. 30, 1943 |
| 2,416,305 | Grieg | Feb. 25, 1947 |